United States Patent [19]

Ball

[11] 4,439,323

[45] Mar. 27, 1984

[54] METHOD OF DISCHARGING SEPTIC TANK FILTERED EFFLUENT

[75] Inventor: Harold L. Ball, Roseburg, Oreg.

[73] Assignee: Orenco Systems, Inc., Roseburg, Oreg.

[21] Appl. No.: 381,029

[22] Filed: May 24, 1982

Related U.S. Application Data

[62] Division of Ser. No. 279,959, Jul. 2, 1981, abandoned.

[51] Int. Cl.$^3$ ............................................. C02F 3/28
[52] U.S. Cl. ............................... 210/608; 210/532.2; 210/744; 210/804
[58] Field of Search ..................... 210/513, 532.2, 525, 210/515, 769, 790, 803, 806, 306, 744, 804, 800, 258, 608, 416.1

[56] References Cited

U.S. PATENT DOCUMENTS

| 1,408,810 | 4/1922 | Lawrence | 210/542 |
| 2,185,785 | 1/1940 | Dorr et al. | 210/525 |
| 2,482,353 | 9/1949 | Loelkes | 210/252 |
| 2,631,976 | 3/1953 | Elliot | 210/532.2 |
| 3,275,565 | 9/1966 | Sailors | 210/533 |
| 4,179,372 | 12/1979 | Rosaen | 210/90 |

OTHER PUBLICATIONS

Go Catch-It Multi Purpose Filter, Go General Equipment & Manufacturing Co., Inc.

Mobil Hydraulics Manual M-2990, 1st Ed. 1967, Sperry Vickers.

*Primary Examiner*—Peter A. Hruskoci
*Assistant Examiner*—Sharon T. Cohen
*Attorney, Agent, or Firm*—Chernoff, Vilhauer, McClung, Birdwell & Stenzel

[57] ABSTRACT

A method for filtering and discharging waste water from a septic tank in predetermined increments and preventing passage of suspended solids from the tank while resisting blockage of the fluid discharge apparatus by such solids. A removable fluid discharge device, such as a submersible pump or dosing siphon with a trigger trap, is enclosed within an encircling filter element which is similarly encircled by a protective housing, and the entire assembly is located within a septic tank immersed in waste water. The protective housing is impervious to the passage of waste water into its interior except through apertures located in the vertical sidewalls so situated as to allow water from only the clearest layer within the tank to enter into the housing and contact the filter. Functionally, the housing protects the filter from blockage by the high concentration of solids present in the layers above and below the clearest layer. The encircling filter has a much larger surface area than the discharge pipe so that sufficient filtered waste water is available for discharge even when the filter becomes substantially blocked.

4 Claims, 4 Drawing Figures

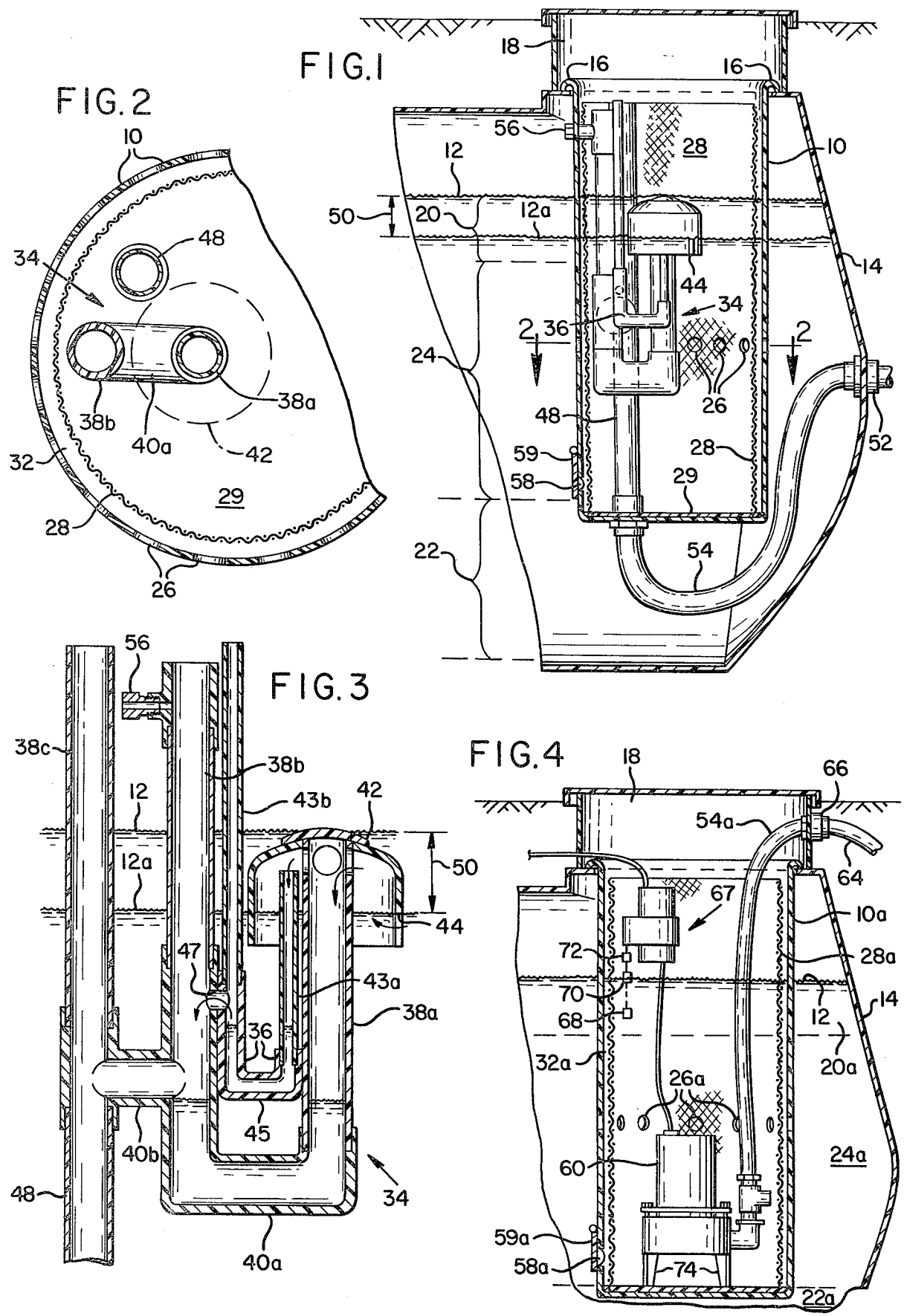

METHOD OF DISCHARGING SEPTIC TANK FILTERED EFFLUENT

This application is a division of application Ser. No. 279,959, filed July 2, 1981 now abandoned.

BACKGROUND OF THE INVENTION

This invention relates to improvements in waste water discharge systems, particularly filtered discharge systems for filtering discharge from high solids-content waste water such as encountered in a septic tank. More particularly, the invention relates to improvements in filtered discharge systems including the provision of incremental liquid discharge apparatus, such as positive pressure pumps or siphons, emplaced within the septic tank and means for filtering even relatively small solid particles from the discharged liquid while resisting clogging by those solids.

In the past, mechanical filtering devices placed within the septic tanks have been generally unsuccessful because the filter quickly becomes clogged by the solids present in the tank. However some degree of filtering is often necessary, especially in those septic tanks which discharge into drainfields. Failure to filter the larger solids from the liquid dischare eventually causes a clogged drainfield, which is generally much more expensive to correct than a clogged filter.

A partial solution to this problem in many septic tanks is to place the mouth of the discharge pipe at a selected level within the septic tank to avoid most of the solids. This practice is based upon the propensity of most solids within a septic tank to either sink to the bottom and form a "sludge" layer or rise to the top of the liquid and form a "scum" layer. The liquid between these layers is relatively "clear." Prior art systems, including those shown in U.S. letters Pat. Nos. 2,482,353, 1,408,810 and 1,150,510, recognize this concept and place the mouth of the discharge pipe within the relatively "clear" area. However, even in this clear area, a screen or filter placed over the mouth of the discharge pipe would generally become quickly clogged because the force of the flow through the discharge pipe would impact solids, which are suspended in the liquid, upon the screen.

Probably the most successful device to date for filtering discharge from septic tanks is a filter manufactured under the trademark GO CATCHIT by Go General Equipment and Manufacturing Co., Inc. However such filter does not facilitate the use of "dosing" discharge devices in septic tanks, nor does it utilize certain advantageous anticlogging structural features, all to be discussed further hereafter.

A common method of discharging a septic tank into a drainfield is characterized by a slow "dribbling" of the outflow caused by the rising level within the tank. This "dribbling" method, combined with the passage of solids into the drainfield, has a marked propensity to clog the drainfield. It has long been recognized that discharging the effluent from the tank in relatively large incremental "doses" is superior to "dribbling" because the increased velocity of the dose spreads the solids-carrying liquid more evenly throughout the drainfield and does not have as much of a tendency to clog the upstream portion of the drainfield as does the practice of "dribbling." Also the alternate "load and rest" cycles characteristic of dosing increases the percolation capacity of the drainfield.

One device for discharging predetermined increments of liquid from a septic tank is a dosing siphon. However the dosing siphon cannot be placed within the septic tank itself because the large pipe diameters capable of passing large solids to prevent clogging of the siphon require a large liquid level differential or "head" to create the pressure necessary to activate the siphon. The large liquid level differential or "head" applied to a typical septic tank with considerable area would result in the discharge of an excessively large volumetric dose, possibly overwhelming the capacity of a typical drainfield. Construction of a larger drainfield capable of handling the large volumetric dose delivered by a dosing siphon discharge would be impracticably expensive. Consequently, a dosing siphon is typically placed in an additional exterior vault, considerably smaller in horizontal cross section than the septic tank, so that the large liquid level differential or "head" does not result in such a large incremental dose. A major shortcoming of this arrangement is that the discharge, although delivered to the drainfield in incremental doses, is still not filtered to remove solids which would tend to clog the drainfield. Moreover, the exterior vault constitutes a considerable added expense, and this arrangement can only be used on sloping lots since the vault and dosing siphon require additional vertical drop between the septic tank discharge and the drainfield.

A "trigger trap" has been used with dosing siphons in some nonwaste water applications to decrease the liquid level differential or "head" which is required to activate the dosing siphon. The trigger trap is comprised of a pipe, considerably smaller than that used for the dosing siphon, which interconnects with the dosing siphon in such a manner as to break the airlock and activate the dosing siphon with a smaller "head." The use of a trigger trap would permit a dosing siphon to be placed within a septic tank and discharge a sufficiently small increment of effluent which could be adequately dispersed by a typical drainfield. However the small pipe comprising the trigger trap would be typically clogged or blocked by the solids present in a septic tank. Except for the aforementioned clogging problem of the "trigger trap," a dosing siphon with a trigger trap, economically located within a septic tank, rather than exterior thereto, would effectively discharge sufficiently small predetermined incremental doses of effluent into the drainfield.

Another method of discharging predetermined incremental doses of effluent from a septic tank is a submersible pump which employs a switch adapted to activate and deactivate the pump according to the level of the surrounding liquid. Pumps are also necessary in positive pressure sewer systems wherein the liquid discharge, instead of flowing through a drainfield, is pumped to a disposal facility. Positive pressure sewer systems are particularly useful in areas which are not suitable for a drainfield and do not have an established gravity sewer system. Such pressure sewer systems can be less costly to build than gravity sewers because the pipes may be smaller and most importantly do not have to be installed to grade. A major drawback to pressure sewer systems however is the large-tolerance, inefficient pumps necessary to pass solids. Pumps placed unprotected in a septic tank require large clearances to pass solids, and are therefore inherently inefficient, requiring more power and larger size than if pumping clear liquid.

Accordingly, what is needed is a filtered waste water discharge system which is capable of enclosing an incremental fluid discharge device such as a pump, or dosing siphon with trigger trap, within a septic tank and preventing the discharge of solids without becoming clogged or blocked by these solids. A small screen covering the intake of these fluid discharge devices would rapidly become blocked by the force of the flow and the solids suspended in the liquid, even in the relatively clear layer. Even a larger screen, enclosing the entire fluid discharge device, would also eventually become blocked from the suspended solids in the clear area and from contact with the "scum" and "sludge" layers.

SUMMARY OF THE INVENTION

The aforementioned problems associated with filtered discharge systems for high solids-content waste water, such as encountered in a septic tank, are overcome in the present invention by enclosing the fluid discharge apparatus within a septic tank or the like, filtering solids from the intake of the fluid discharge apparatus, and protecting the filtering device from contact with and clogging by the bulk of the solids present in the surrounding liquid.

According to the invention, a housing is enclosed within a tank containing high solids-content waste water. The size and shape of the housing are such that an impervious portion of the housing extends downward through the "scum" layer within the tank into the "clear" layer where apertures are formed in the wall of the housing to permit the surrounding "clear" waste water to enter the housing. Thus the configuration and placement of the housing within the tank provide for only "clear" waste water from a preselected level of the tank to enter into the housing. Preferably the housing has an open top extending well above the maximum liquid level or top of the "scum" layer within the tank.

A hollow screen or filter, slightly smaller than but of the same general shape as the housing, which is impervious to solids greater than a predetermined size but pervious to liquids and smaller solids, is nested within the housing in a spaced relationship to the wall thereof. Preferably the filter, like the housing, is of a vertical tubular shape open at the top and extending well above the liquid level or "scum" layer. The bottom of the filter is closed so that liquid may not enter within the hollow filter except through the filter element.

A liquid discharge apparatus, conceivably as simple as an outflow pipe, but preferably also capable of discharging predetermined incremental doses of effluent, is emplaced within the hollow filter enclosure and attached to the outflow pipe. Such incremental discharge apparatus may comprise, for example, a dosing siphon or pump preferably located within the hollow filter enclosure but possibly alternatively located outside the filter enclosure with only an inlet conduit inside the enclosure. Preferably the housing, filter and discharge apparatus are arranged so that the entire assembly may be lifted out of the tank for repair or cleaning.

In operation, only liquid from the relatively "clear" area is allowed into the housing through the abovementioned apertures. The otherwise impervious wall of the housing protects the filter from contact with the bulk of the solids in the "scum" layer and "sludge" layer. Moreover, placement of the apertures in the vertical side walls of the housing and the impervious nature of the bottom of the housing ensure that most solids rising out of the "sludge" layer and migrating toward the "scum" layer will not enter into the housing and impact on the filter.

During a prolonged period of use, the "scum" and "sludge" layers will gradually grow toward each other, and the tank must eventually be pumped out. However placement of the apertures in the housing near the top of the lower two-thirds of the "clear" layer ensures that the filtered discharge system will continue to draw liquid from the "clear" layer despite the convergence of the other two layers until pumping of the tank is necessary. The relatively large clearance between the inside of the housing and the hollow filter permits solids, which are small enough to pass through the housing apertures but too large to pass through the filter, to migrate beyond the immediate area of the housing apertures so as to prevent blocking of the clearance in such area, which would otherwise isolate and render ineffective the rest of the filter surface area. Although access of these solids to the filter area permits some blockage of portions of the filter, the fact that the filtering element is almost as large as the housing provides a large filter area which is unlikely to become completely blocked by solids, especially since the filter area is preferably vertically oriented. The comparatively large, protected, vertical filter area which serves a relatively small cross section of outflow opening enables the filtered discharge system to work satisfactorily long after comparable filter systems would have become completely blocked.

Accordingly, it is a principal objective of the present invention to provide a method for using a filtered discharge system which is capable of filtering discharge from high solids-content waste water while resisting clogging by those solids.

It is a further object of the present invention to provide such a method for using which incorporates a fluid discharge system capable of discharging incremental doses of liquid.

It is a further object of the present invention to provide such a method for using a filtered discharge system apparatus which can be placed directly within the tank containing the high solids-content liquid but be easily removed and disassembled for cleaning and repair.

The foregoing and other objective, features, and advantages of the invention will be more readily understood upon consideration of the following detailed description of the invention, taken in conjunction with the accompanying drawings.

BRIEF DESCRIPTION OF THE DRAWINGS

FIG. 1 is a sectional view of one embodiment of the invention which employs a dosing siphon with a trigger trap as the fluid discharge apparatus.

FIG. 2 is a fragmentary enlarged sectional top view of the embodiment shown in FIG. 1 taken along line 2—2.

FIG. 3 is a sectional schematic drawing of the dosing siphon with trigger trap shown in the embodiment of FIG. 1 with the components thereof repositioned side-by-side in a generally planar configuration for clarity.

FIG. 4 is a sectional view of another embodiment of the invention which employs a pump as the fluid discharge apparatus.

DETAILED DESCRIPTION OF THE INVENTION

Referring to an exemplary first embodiment illustrated in FIGS. 1, 2 and 3, an open-topped, cylindrical housing 10, preferably of polyethylene, is shown in FIG. 1 partially submerged in waste water 12 held within a septic tank 14. The open top of the housing 10 incorporates an annular collar 16 which rests upon a recessed ledge in the access well 18 of the septic tank 14, suspending the housing 10 downwardly into the tank 14. The waste water 12 within the tank 14 is generally divided into three layers by gravity and by bacteria acting upon the wastes within the tank. A layer comprising a large concentration of floating solids called the "scum" layer 20 is formed in the surface of the waste water 12. The "sludge" layer 22, another layer comprising a high concentration of solids having a specific gravity greater than that of water, is formed upwardly from the bottom of the tank 14. Between the "sludge" layer 22 and the "scum" layer 20 exists a "clear" layer 24 which has relatively few suspended solids within it. The bacterial action working in the tank causes the solids to migrate between the respective layers.

The housing 10 is substantially impervious to the passage of the waste water 12 into the interior of the housing except through an encircling horizontal row of apertures 26 in the vertical walls of the housing. No waste water may spill into the open top of the housing 10 because the top is well above the maximum waste water level. The placement of apertures 26 in the housing 10 corresponds substantially with the top of the lower two-thirds of the "clear" layer 24 in the surrounding waste water 12 so that the apertures 26 will remain in the clear portion 24 of the waste water 12 as the scum layer 20 and the sludge layer 22 gradually grow towards each other. This also positions the apertures 26 more distant from the "sludge" layer from which solids are more likely to migrate, and thereby minimizes their exposure to such migrating solids. The substantially vertical orientation of the apertures 26 in the vertical walls of the housing 10 further minimizes the likelihood that solids which rise from the "sludge" layer 22 or sink from the "scum" layer 20 will pass through the apertures 26 to the interior of the housing 10.

Nested in spaced relationship within the housing 10 is an open-topped vertical cylindrical plastic mesh filter 28, the bottom of which, in this exemplary embodiment, is embedded within a hardened fiberglass resin 29 resting upon, but not adhered to, the bottom of the polyethylene housing 10 and the top of which extends well above the maximum waste water level so that waste water may enter within the encircling filter 28 only through the mesh of the filter. Preferably the filter 28 has a mesh having openings about ⅛ inch square.

Turning to FIG. 2, the annular clearance 32 between the vertical walls of the housing 10 and the vertical walls of the filter 28 should be sufficient to allow solids likely to pass through the apertures 26 to also pass through the clearance 32 and thus be capable of distribution over the entire large surface area of the filter 28. For example, the apertures 28 would preferably be about two inches in diameter, and the annular clearance 32 about 1 to 1½ inches which, because of the deformable nature of the solids, would allow them to pass through the clearance 32 to any portion of the filter 28. In this way blockage of the clearance 32 in the immediate proximity of the apertures 26 is prevented, which would otherwise defeat the antiblocking advantage of the large filter area.

Thus, in operation, waste water which enters within the filter 28 has been through three successively selective solids removal processes: selection from the clear layer 24, gross solids removal by passing through the apertures 26 in the housing 10, and finally small solids removal by passing through the mesh of the filter 28. Because of the protection of the filter 28 by the housing 10, the large filter area made continually accessible by the large clearance 32, and the fact that the configuration of the housing 10 and filter 28 are such that there are virtually no horizontal surfaces upon which solids may rest and collect, the foregoing filtering of solids from the discharge liquid can continue over a long period of time with no danger of malfunction due to total blockage.

Providing for fluid discharge from within the filter enclosure 28 may be done in various ways without departing from the present invention. In the particular device illustrated in FIGS. 1 and 2, the means provided for fluid discharge is a substantially conventional dosing siphon, generally indicated as 34, with a trigger trap 36, which is capable of discharging fluid in predetermined incremental doses. The dosing siphon 34 as shown in partial schematic in FIG. 3 is comprised of three generally vertical lengths of pipe 38a, 38b and 38c of a first inside cross-sectional area interconnected by two generally horizontal conduits 40a and 40b of the same cross-sectional area, one of the vertical pipes 38a being attached in annular spaced relationship to a bell-like hood 42 so that the hood 42 covers, without blocking the upper mouth of, the vertical pipe 38a and extends downwardly into the waste water. The hood 42 is formed with a slot 44 in the side thereof extending upwardly from the bottom edge of the hood. The trigger trap 36 is comprised of two vertical pipes, 43a and 43b similarly covered by the hood 42 and interconnected by a horizontal conduit 45, all of a second, substantially smaller cross-sectional area than the pipes 38a, b, c and interconnected therewith through a passage 47 as shown in FIG. 3.

In operation the gradually rising level of the waste water 12 in the tank 14 and the corresponding rising water level within the housing 10 and filter enclosure 28 act to compress the air within the hood 42 and within the vertical pipe 38a of the dosing siphon and the vertical pipe 43a of the trigger trap, thereby exerting a downward pressure on the water within the vertical pipes of the siphon 34 and the trigger trap 36. When the waste water level reaches a predetermined maximum upper level indicated by the reference numeral 12, the downward pressure in vertical pipe 43a of the trigger trap 36 forces enough water through the interconnecting passage 47 between the trigger trap 36 and the dosing siphon 34 to allow the compressed air in the vertical pipe 43a to pass through the horizontal conduit 45 of the trigger trap 36 and escape upwardly through vertical pipe 43b, relieving the air pressure in the hood 42 and allowing the water to rush into the hood, down the pipe 38a and into discharge conduit 48 thus activating the siphoning action. The siphon 34 will continue to discharge waste water 12 until the level of the waste water falls to the level 12a just below the topmost portion of the slot 44 in the hood 42. This permits air to be sucked into the hooded pipes of the siphon 34 and the trigger trap 36, thus breaking the siphoning action, stopping the discharge and thereby discharging a predetermined dose of filtered waste water as shown by the level difference 50 indicating the amount of discharged waste water 12. The siphoning action repeats itself automatically when the maximum upper level 12 of the waste water is again reached.

Upon inspection of FIG. 1 it will be seen that the discharge conduit 48 of the dosing siphon 34 is connected to the tank outlet 52 by a sufficient length of flexible hose 54 so that the entire discharge assembly, including housing 10, filter 28 and siphon 34, may be lifted out of the tank 14 through the access well 18 to be cleaned or repaired. Furthermore, the lowermost portion of the discharge conduit 48 is releasably connected to the flexible hose 54 where they join at the bottom of the housing 10 and the entire dosing siphon 34 is releasably fastened to the housing 10 by fastening means 56, to provide for complete removal of the dosing siphon 34 from the housing 10. Similarly, once the fastening means 56 have been disconnected and the siphon 34 lifted out of the housing 10 the cylindrical filter 28 may also be removed from the housing 10.

To facilitate the removal and replacement of the discharge assembly within the septic tank 14, a drainhole 58 having a hinged flap valve 59 is located in the lowermost vertical wall of the housing 10 to permit water to escape from the housing 10 during removal of the housing from the tank while preventing entry of the surrounding liquid.

FIG. 4 illustrates a second embodiment of the invention, similar in most respects to the first embodiment, which employs an electric submersible pump 60 as the fluid discharge device. Pumps are employed in positive pressure sewage systems and in situations where the drainfield is level with or above the septic tank. As shown in FIG. 4 this embodiment also comprises an open-topped cylindrical housing 10a and an open-topped cylindrical plastic mesh filter 28a nested within it, separated therefrom by a relatively large clearance 32a, suspended within a septic tank 14 of waste water 12 in a manner similar to that previously discussed. As in the first embodiment, the waste water 12 within the tank 14 is separated into three layers; the "scum" layer 20a, the "sludge" layer 22a and the "clear" layer 24a. An encircling horizontal row of apertures 26a formed in the vertical walls of the otherwise impervious housing 10a are positioned at a height relative to the "clear" layer 24a in the surrounding liquid similarly to the positioning of apertures 26 in FIG. 1.

The pump 60 discharges waste water through a flexible hose 54a which is releasably connected to a discharge pipe 64 by a coupling 66 located in the side wall of the access well 18 so that the entire discharge assembly may be conveniently lifted out of the tank 14 and easily disassembled for cleaning and repair. A drainhole 58a having a hinged flap valve 59a is located in the lowermost vertical side walls of the housing 10a to provide a drain for removing the assembly while preventing surrounding liquid from entering within the housing 10a through the drainhole.

Electrical switch assembly 67, preferably of the mercury type, adapted to activate and deactivate the pump 60 according to the liquid level within the tank 14, is connected to the pump and to respective level sensors 68, 70 and 72 placed within the filter enclosure at preselected levels as shown in schematic in FIG. 4 with the SWITCH OFF sensor 68 being lowermost, and the SWITCH ON sensor 70 spaced relatively above it according to the size of the incremental dose desired to be discharged. In the preferred embodiment shown in FIG. 4, an alarm level sensor 72 is situated relatively above the SWITCH ON sensor 70, designed to be activated if the sensor 70 fails to activate the pump 60 and the water level has risen to the level of the alarm sensor 72.

In the form of the invention shown in FIG. 4, legs 74 are provided for the purpose of supporting the pump 60 within the housing 10a and raising the intake of the pump 60 away from the floor of the housing 10a where small solids, capable of passing through the mesh filter 28a, may rest and collect. It is also contemplated that other types of pumps, such as a submersible well pump, may be employed within the filter enclosure.

It will be apparent in the exemplary embodiments shown in FIG. 1 and FIG. 4 that the effective surface areas of the mesh filters 28 and 28a respectively are far greater than the cross-sectional areas of the respective discharge hoses 54 and 54a so that the filtered discharge assembly will continue to operate efficiently even if extensive portions of the protected filters 28 and 28a should eventually become blocked. However, in view of the abovedescribed safeguards, even such partial blockage will occur only after a considerable period of use. Accordingly it will be appreciated that frequent removal and cleaning of the filters 28 and 28a will not be necessary.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of discharging filtered effluent from a septic tank containing waste water having a significant concentration of waste solids distributed into a lower horizontal sludge layer and an upper horizontal scum layer with a relatively clear horizontal layer therebetween through which waste solids migrate in a generally vertical direction between said sludge and scum layers, said method comprising:

(a) providing a hollow filter enclosure, having a filtering surface with exterior and interior sides, respectively, within said septic tank;

(b) exposing the exterior side of said filtering surface to waste water occupying a predetermined level within said septic tank located above said sludge layer and below said scum layer, while simultaneously preventing exposure of said exterior side of said filtering surface to waste water within said septic tank which does not occupy said predetermined level by surrounding said filtering surface with a housing having apertures located in said housing to correspond to said predetermined level of said waste water, said housing being otherwise impervious to the passage of said waste water;

(c) exposing an incremental effluent discharge apparatus, communicating between the interior and exterior of said septic tank and having a cross sectional area for conducting effluent which is smaller than the area of said filtering surface, operatively to the interior side of said filtering surface while preventing operative exposure of said discharge apparatus to waste water exterior of said filtering surface; and (d) passing effluent, from said waste water occupying said predetermined level, through said aperatures and said filtering surface from the exterior side to the interior side thereof and thence through said incremental effluent discharge apparatus to the exterior of said septic tank by passing said effluent through said incremental effluent discharge apparatus in predetermined incremental amounts which are insufficient to permit said scum layer to descend into said pedetermined level.

2. The method of claim 1 wherein step (b) further includes preventing exposure of said exterior side of said filtering surface to waste solids moving vertically through said predetermined level by orienting said apertures vertically in said housing.

3. The method of claim 2 or 3 wherein step (b) includes exposing the exterior side of said filtering surface to waste water occupying a predetermined level more distant from the top of said sludge layer than from the bottom of said scum layer.

4. The method of claim 2 or 3, including orienting said filtering surface vertically and thereby preventing the collection of waste solids thereon.

* * * * *

UNITED STATES PATENT AND TRADEMARK OFFICE
CERTIFICATE OF CORRECTION

PATENT NO. : 4,439,323
DATED : March 27, 1984
INVENTOR(S) : Harold L. Ball

It is certified that error appears in the above-identified patent and that said Letters Patent is hereby corrected as shown below:

Col. 1, line 48   Change "CATCHIT" to --CATCH-IT--.

Col. 10, line 3   Change "2 or 3" to --1 or 2--.

Col. 10, line 8   Change "2 or 3" to --1 or 2--.

Signed and Sealed this

Twenty-sixth Day of June 1984

[SEAL]

Attest:

Attesting Officer

GERALD J. MOSSINGHOFF

Commissioner of Patents and Trademarks